United States Patent
Billau et al.

(10) Patent No.: US 9,537,898 B2
(45) Date of Patent: *Jan. 3, 2017

(54) SHARED SECURITY UTILITY APPLIANCE FOR SECURE APPLICATION AND DATA PROCESSING

(71) Applicant: International Business Machines Corporation, Armonk, NY (US)

(72) Inventors: Ronald L. Billau, Rochester, MN (US); Vincenzo V. Di Luoffo, Sandy Hook, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/834,020

(22) Filed: Aug. 24, 2015

(65) Prior Publication Data

US 2015/0365440 A1 Dec. 17, 2015

Related U.S. Application Data

(63) Continuation of application No. 14/301,498, filed on Jun. 11, 2014.

(51) Int. Cl.
*H04L 29/06* (2006.01)
*G06F 21/86* (2013.01)
(Continued)

(52) U.S. Cl.
CPC .......... *H04L 63/20* (2013.01); *G06F 21/602* (2013.01); *G06F 21/6209* (2013.01);
(Continued)

(58) Field of Classification Search
CPC ...... H04L 63/04; H04L 63/0428; H04L 63/08; H04L 63/10; H04L 63/105; H04L 63/20; H04L 2463/102; G06F 21/60; G06F 21/602; G06F 21/62; G06F 21/6209; G06F 21/6218; G06F 21/70; G06F 21/78; G06F 21/86; G06F 2221/2107; G06F 2221/2113
See application file for complete search history.

(56) References Cited

U.S. PATENT DOCUMENTS

| 5,608,612 A | 3/1997 | Hokao | |
| 5,799,083 A * | 8/1998 | Brothers | G08G 1/0175 |
| | | | 348/E7.06 |

(Continued)

FOREIGN PATENT DOCUMENTS

| EP | 2196936 A1 | 6/2010 |
| WO | 1998015086 A1 | 4/1998 |

(Continued)

OTHER PUBLICATIONS

International Business Machines Corporation, "List of IBM Patents or Patent Applications Treated As Related," Aug. 25, 2015, 2 pages.

(Continued)

*Primary Examiner* — Zachary A Davis
(74) *Attorney, Agent, or Firm* — Patterson + Sheridan, LLP

(57) ABSTRACT

A method is disclosed that includes registering an application with a security information technology element (ITE), where the security ITE includes a secure computing device located within a protection envelope and configured to provide security services for one or more applications. The security ITE also provides a secure processing environment for hosting applications, and includes cryptographic services and hardware acceleration. A security manager within the security ITE is configured to erase data within the protection envelope upon detecting physical tampering.

20 Claims, 10 Drawing Sheets

(51) Int. Cl.
*H04L 29/08* (2006.01)
*G06F 21/62* (2013.01)
*G06F 21/60* (2013.01)
*H04W 12/06* (2009.01)
*H04W 12/08* (2009.01)

(52) U.S. Cl.
CPC .......... *G06F 21/6218* (2013.01); *G06F 21/86* (2013.01); *H04L 63/0428* (2013.01); *H04L 63/0485* (2013.01); *H04L 63/062* (2013.01); *H04L 67/10* (2013.01); *H04W 12/06* (2013.01); *H04W 12/08* (2013.01); *H04L 2463/102* (2013.01)

(56) References Cited

U.S. PATENT DOCUMENTS

| | | | |
|---|---|---|---|
| 6,233,339 B1 * | 5/2001 | Kawano | G06F 21/87 380/44 |
| 7,178,033 B1 * | 2/2007 | Garcia | G06F 21/10 713/165 |
| 7,428,751 B2 | 9/2008 | Oom Temudo de Castro et al. | |
| 7,743,069 B2 * | 6/2010 | Chitkara | G06F 17/30595 707/781 |
| 7,827,398 B2 * | 11/2010 | Liu | H04L 63/0485 380/255 |
| 8,176,336 B1 | 5/2012 | Mao et al. | |
| 8,245,042 B2 * | 8/2012 | Chinen | G06F 21/6209 380/241 |
| 8,249,257 B2 | 8/2012 | Brutch et al. | |
| 8,291,238 B2 | 10/2012 | Ginter et al. | |
| 8,458,801 B2 | 6/2013 | Furusawa et al. | |
| 8,799,322 B2 * | 8/2014 | deMilo | G06F 17/30082 707/791 |
| 8,826,003 B2 * | 9/2014 | Gearhart | H04L 63/0485 709/238 |
| 2003/0137416 A1 | 7/2003 | Fu et al. | |
| 2007/0266256 A1 | 11/2007 | Shah et al. | |
| 2009/0086979 A1 | 4/2009 | Brutch et al. | |
| 2009/0106563 A1 * | 4/2009 | Cherpantier | G06F 21/86 713/194 |
| 2009/0165117 A1 | 6/2009 | Brutch et al. | |
| 2010/0318786 A1 | 12/2010 | Douceur et al. | |
| 2011/0246766 A1 | 10/2011 | O'Hare et al. | |
| 2011/0271096 A1 * | 11/2011 | Bharrat | H04L 63/0485 713/153 |
| 2012/0102307 A1 | 4/2012 | Wong | |
| 2013/0219176 A1 | 8/2013 | Akella et al. | |
| 2014/0013425 A1 | 1/2014 | Samson | |
| 2014/0282825 A1 | 9/2014 | Bitran et al. | |
| 2015/0365227 A1 | 12/2015 | Billau et al. | |
| 2015/0365435 A1 * | 12/2015 | Billau | H04L 63/20 726/1 |

FOREIGN PATENT DOCUMENTS

| | | |
|---|---|---|
| WO | 2006002282 A1 | 1/2006 |
| WO | 2013036097 A1 | 3/2013 |
| WO | 2013101081 A1 | 7/2013 |

OTHER PUBLICATIONS

Federal Information Processing Standards Publication (FIPS PUB) 140-2, "Security Requirements for Cryptographic Modules," National Institute of Standards and Technology, May 25, 2001. 69 pages.

* cited by examiner

SHARED SECURITY UTILITY APPLIANCE FOR SECURE APPLICATION AND DATA PROCESSING

CROSS-REFERENCE TO RELATED APPLICATIONS

This application is a continuation of co-pending U.S. patent application Ser. No. 14/301,498 filed Jun. 11, 2014. The aforementioned related patent application is herein incorporated by reference in its entirety.

BACKGROUND

The present disclosure relates to secure computing, and more specifically, to providing physical and logical security for secure application and data processing.

The interconnection of computers and other devices in widely distributed networks often leaves data contained in those networks and devices vulnerable to unauthorized access and modification, whether the data is transiting the network or at rest.

Various industries or fields may dictate differing, if not entirely idiosyncratic, sets of security requirements related to the transmission and storage of sensitive data, so that any applications designed to handle this data must be programmed to comply with at least the minimum requirements. Over time, however, security requirements may change or individual experiences may necessitate updating the security features programmed into the application. As these security measures are ordinarily developed or implemented independently, application programmers may be hindered from developing and using a collective set of best practices for the industry.

SUMMARY

Embodiments described herein provide an apparatus for secure application and data processing. The apparatus includes a physical enclosure defining a protection envelope, and a secure computing device disposed within the protection envelope. The secure computing device includes one or more computer processors, a system memory containing an operating system configured to execute on the one or more computer processors, a security manager configured to prevent physical tampering with the physical enclosure, a cryptographic engine configured to provide hardware-based security algorithms, and a plurality of field programmable gate arrays (FPGAs) configured to provide a secure boot service for the apparatus and to provide hardware-acceleration services for third-party applications. The security manager is configured to erase data within the protection envelope upon detecting a tampering event, the data including security data related to the cryptographic engine and additional data related to the plurality of FPGAs.

BRIEF DESCRIPTION OF THE SEVERAL VIEWS OF THE DRAWINGS

So that the manner in which the above recited aspects can be understood in detail, a more particular description of embodiments of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
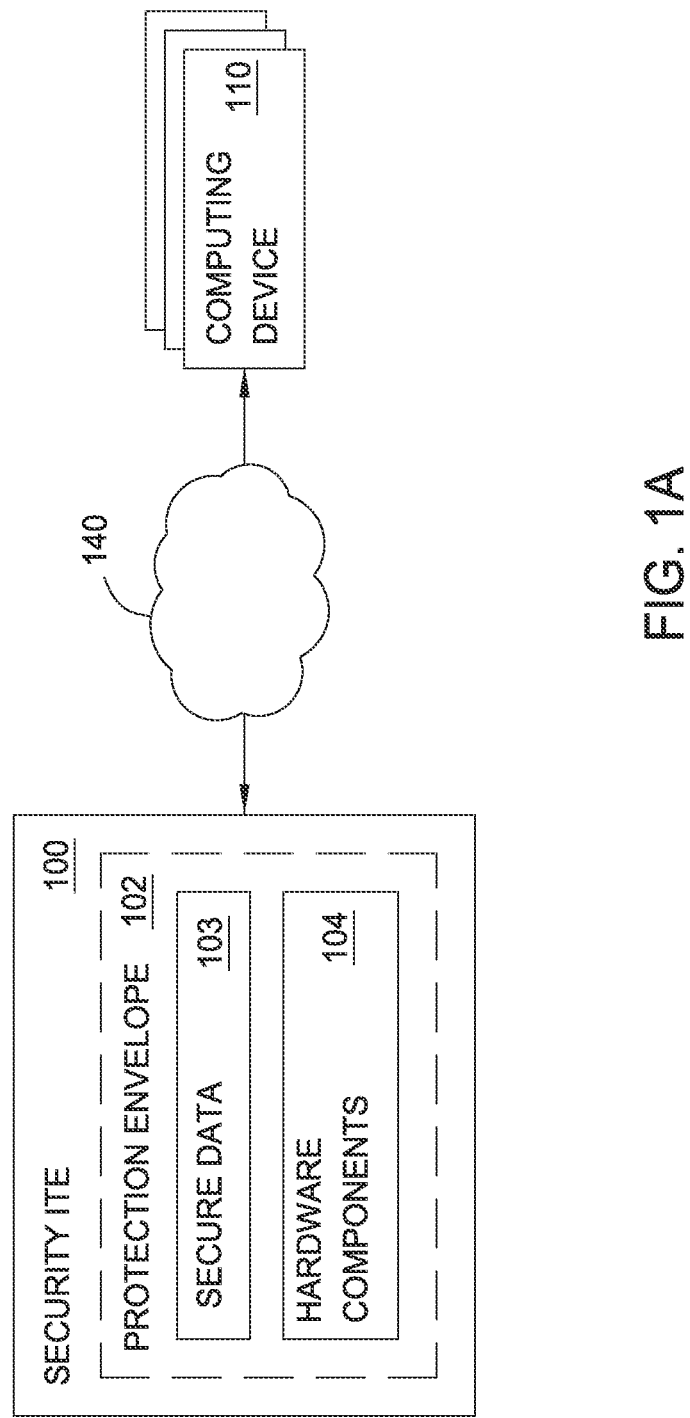
FIG. 1A illustrates a security information technology element (ITE) for secure application and data processing, according to one embodiment.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects, and each embodiment may generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may request security services in order to protect data or to execute applications securely in the cloud. For example, a user may provide data to be protected, and the requested security services could execute on a computing system in the cloud, providing encryption and/or information dispersal for secure transmission of the data between devices in the cloud and/or storage of the data at a storage location in the cloud. Doing so allows a user to access this information from any computing system attached to a network connected to the cloud (e.g., the Internet).

FIG. 1A illustrates a security ITE for secure application and data processing, according to one embodiment. As shown, security ITE 100 includes a protection envelope 102, within which secure data 103 and hardware components 104 are depicted. Though depicted as separate entities within the protection envelope 102, part or all of secure data 103 may reside within one or more of the hardware components 104. Protection envelope 102 is generally configured to provide both logical and physical security for elements located within the envelope. The protection envelope may include a physical enclosure that physically surrounds the hardware components, in addition to one or more measures for ensuring the security and integrity of the data residing in the envelope.

As shown, security ITE 100 is coupled with one or more computing devices 110 via a network 140, and may communicate with the one or more computing devices 110 using any feasible protocol (such as TCP/IP). Generally, the security ITE 100 is configured to provide modular security services for the computing devices 110 (such as secure application and data processing). For example, a particular computing device 110 may transmit data via network 140 to the security ITE 100 for encryption.

The security ITE 100 may provide modular security services for the computing devices 110, and may perform the services using a set of best practices. Examples of the security services include executing applications specified by the computing devices 110 within a secure environment and/or processing data received from the computing devices 110 within a secure environment. The security ITE 100 may provide security services as requested by the computing devices 110; for example, using only those parameters and settings explicitly provided by the computing device. Additionally or alternatively, the security ITE 100 may apply a set of best practices for requested security services, so that computing devices 110 may obtain a preferred result from the security ITE 100 without specifying exactly how the security services are to be performed. By doing so, the security ITE 100 may provide more consistent and/or enhanced security for applications running on computing devices 110 when compared to implementing and maintaining similar security functions within each of the applications in isolation.

Figure 1B:
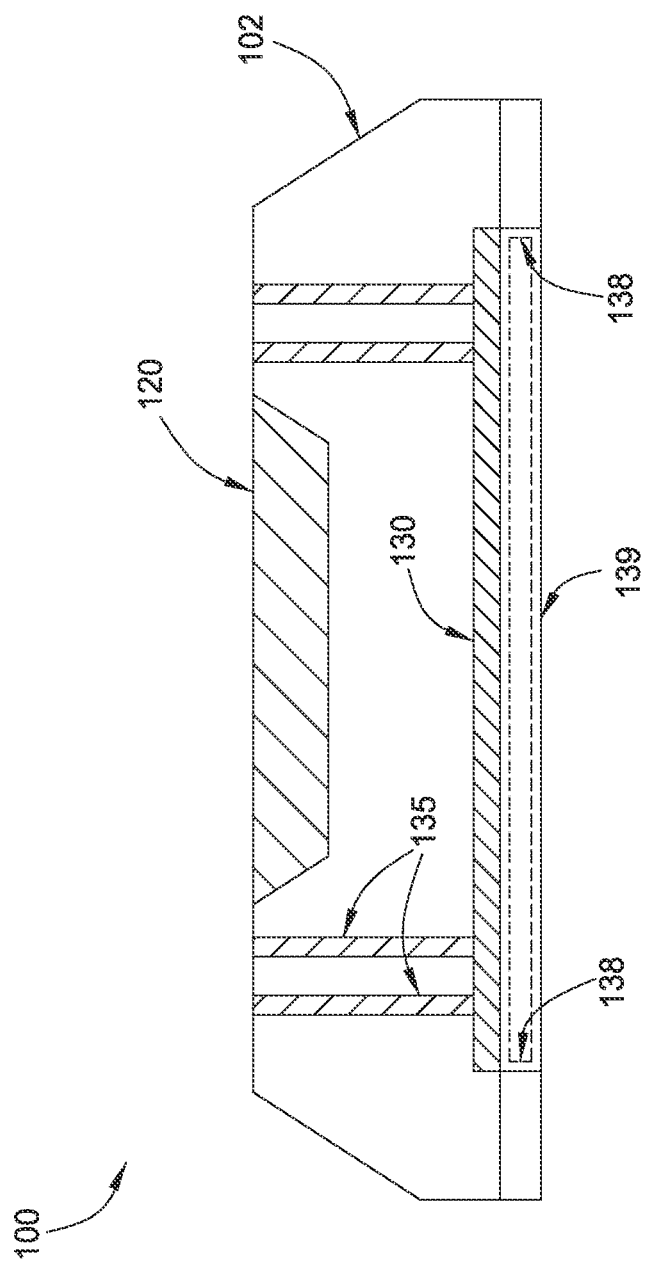
FIG. 1B illustrates a side view of a security ITE, according to one embodiment.

FIG. 1B illustrates a cross-section view of a security ITE, according to one embodiment. As shown, security ITE 100 includes a physical enclosure defining a protection envelope 102 (thick line). Though not depicted in the current view, protection envelope 102 is generally configured to entirely enclose the hardware components in order to prevent (or at least detect) physical tampering with the security ITE 100. The physical enclosure may be preferentially constructed of any material(s) having suitable strength to prevent physical intrusions into the security ITE 100. In one embodiment, the physical enclosure may be constructed of sheet metal, such as steel, and may be selected to have any preferred thickness, for example, a thickness between 1 and 6 millimeters. The protection envelope 102 may enclose any number of hardware components configured to provide security services to the computing device 110, such as a printed circuit board (PCB) 130. As will be described in greater detail below, PCB 130 may include or may be coupled to additional hardware components, such as computer processors, memory modules, storage devices, network cards, expansion cards, etc., each of which may also be enclosed within protection envelope 102 to ensure the security and integrity of data residing in the components.

The physical enclosure may include processors or other hardware components that generate significant amounts of heat within the enclosure. To provide improved heat removal from the enclosure into the surrounding environment, the physical enclosure may be configured to interface with one or more heat sinks 120. The thickness of the physical enclosure may also be selected based on heat transfer capabilities. As shown, heat sink 120 and the physical enclosure may selectively have complementing dimensions, shapes, positions, and orientations capable of supporting a desired amount or rate of heat transfer, and/or may be designed based on a desired overall form factor for the security ITE 100. Heat sink 120 may be located outside the protection envelope 102, and may be a separate element attached to the physical enclosure or may be integrally formed as part of the exterior of the physical enclosure.

Heat removal may additionally be accomplished by conducting heat directly from specific areas or from components to the physical enclosure or to heat sink 120, where the heat may be removed to the environment. One or more conduction elements 135 may be included within the physical enclosure, and may be configured to physically couple the enclosure to specific components; in one example, the conduction elements 135 may be attached to the physical enclosure and coupled to one or more heat sink fins extending from a processor located on PCB 130. The conduction elements 135 may further provide structural stability to the physical enclosure.

To secure the PCB 130 (as well as any components connected thereto) from physical tampering from beneath, PCB 130 may be isolated from the bottom of the physical enclosure by a fencing structure having walls 138 and floor 139 interposed between PCB 130 and the physical enclosure and further enclosing the bottom of PCB 130. The fencing structure may be arranged so that floor 139 is located directly atop the bottom (i.e., the sheet metal) of the physical enclosure. In an alternate embodiment, the floor 139 of the fencing structure forms part of the bottom of the physical enclosure.

Figure 2A:
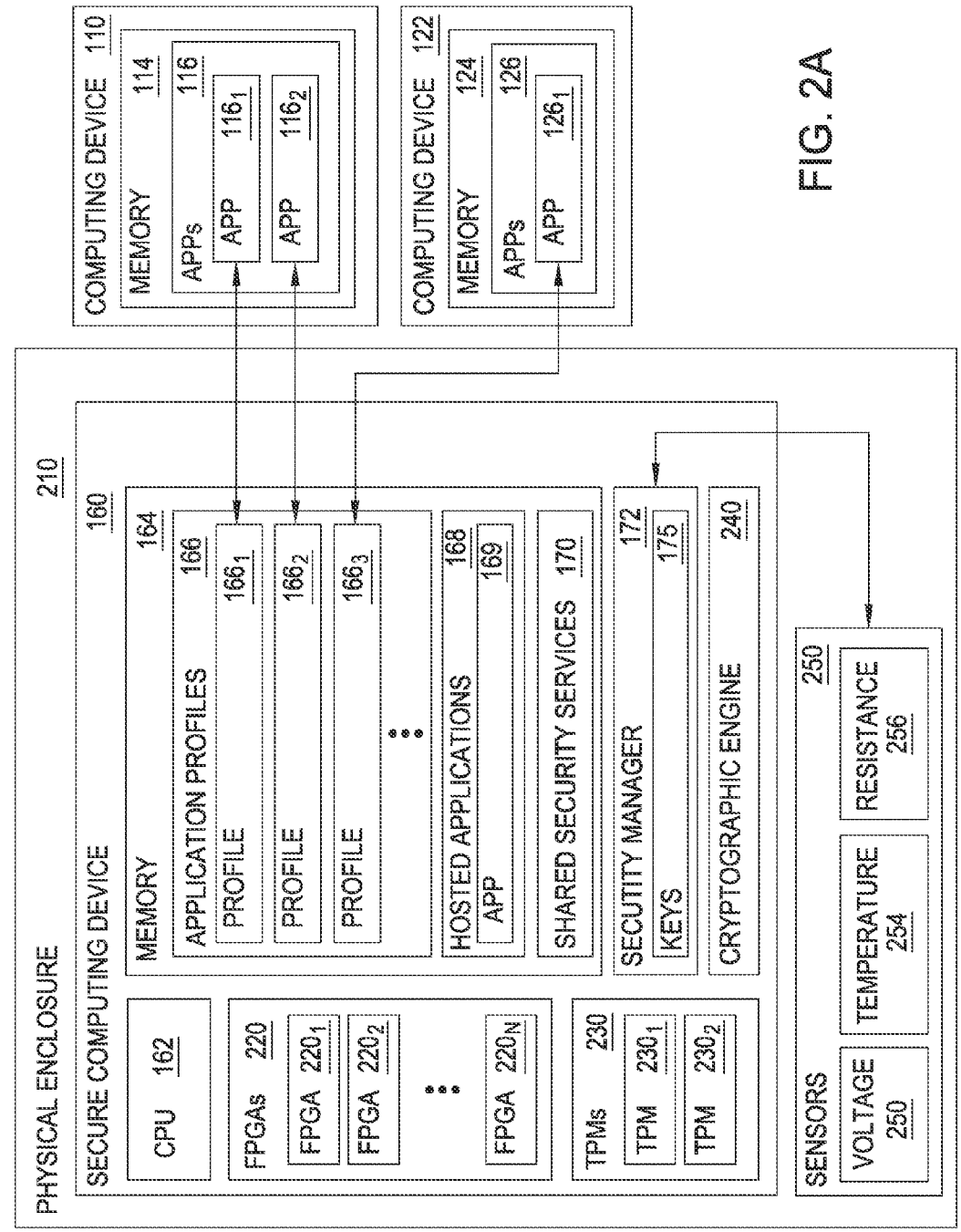
FIG. 2A illustrates a block diagram of components of a security ITE, according to one embodiment.

FIG. 2A illustrates a block diagram of components of a security ITE, according to one embodiment. As shown, security ITE 100 includes a physical enclosure 210, and a secure computing device 160 and sensors 250 located within the physical enclosure. The physical enclosure 210 may generally be the same or similar to the physical enclosure described above with respect to FIG. 1B (i.e., the physical enclosure 210 may define the protection envelope for the security ITE). The secure computing device 160 may be coupled to one or more computing devices 110, 122 through a network such as network 140 (not shown).

As shown, secure computing device 160 includes several hardware components ordinarily included in a general purpose computing system, such as central processing unit (CPU) 162 and memory 164. CPU 162 may include any processing element capable of performing the functions described herein. While depicted as a single element within secure computing device 160, CPU 162 is intended to represent a single processor, multiple processors, a processor or processors having multiple cores, as well as combinations thereof. The memory 164 may be volatile or non-volatile memory, and may include a random access memory (RAM), Flash memory, cache, disk drives, solid state drives, and the like. Although shown as a single entity, the memory 164 may be divided into different memory elements, such as RAM and one or more hard disk drives.

Memory 164 may contain one or more application profiles 166 which specify the security functions to be performed by the security ITE 100 for the application. The application profile 166 may be created specific to each application registered with the security ITE 100; for example, computing device 110 has registered applications $116_{1,2}$ (stored in memory 114) with the security ITE 100 and corresponding application profiles $166_{1,2}$ are stored in memory 164 (the computing device 122 has a similarly registered application $126_1$ stored in memory 124 and corresponding to application profile $166_3$). Application profiles may be created using an application programming interface (API). The profiles can include multiple fields for including additional information about the application, such as a unique name and identifier for the application, an industry type for the application (such as healthcare or finance), an estimated data quota, and any performance requirements. Application profiles may also include one or more fields for a user to specify preferences for the security services to be provided, such as whether to perform data splitting and which algorithm to use, which cryptographic algorithm to use and a required key length. The application profiles may further provide a default setting for one or more of the preferences, in which the security ITE 100 may apply best practices. In another embodiment, the security ITE 100 may apply best practices for the security services based on the specified industry type. For example, security ITE 100 may apply security settings to meet at least regulated minimum security requirements for the industry; security ITE 100 may apply more stringent settings based on its determined best practices.

As shown, memory 164 contains one or more hosted applications 168 to be operated using the computing resources of secure computing device 160. The hosted applications are generally executed using CPU 162, one or more FPGAs 220, or some combination thereof. Memory 164 also contains shared security services 170 which may generally implement various algorithms for securing data, such as algorithms for encryption or for data splitting; the shared security services 170 may run as software on CPU 162, and additionally or alternately, the functions may be implemented in one or more FPGAs 220 or cryptographic engine 240.

Secure computing device 160 may further include specialized hardware components. As shown, secure computing device 160 includes a plurality of field-programmable gate arrays (FPGAs) 220, a plurality of Trusted Platform Modules (TPMs) 230, a cryptographic engine 240, and a compression engine (not shown). Because of the accelerated performance using hardware-based logic, one or more FPGAs 220 may be used to provide security services to coupled computing devices; these FPGAs may operate in conjunction with software executing on the security ITE 100 (i.e., the shared security services 170 executing on CPU 162) and allow for concurrent processing of security algorithms. Additionally, FPGAs may be configured to provide hardware acceleration for any applications hosted on the secure computing device, such as hosted application 169. Each FPGA may specifically be configured (or reconfigured) optimally based on the application's requirements.

The TPMs 230 may ensure integrity of the security ITE 100 by authenticating the hardware configuration of the security ITE 100 upon booting, as well as authenticating the booting of applications hosted on the security ITE 100. In this way, the TPMs may prevent unauthorized access to protected data (i.e., data in the protective envelope) by detecting operation of the security ITE 100 with unauthorized or unrecognized hardware or applications. During the application registration process, TPMs 230 may be used to acquire and store integrity measurement values corresponding to the application; these integrity measurement values may then be compared against measurement values on a subsequent boot to authenticate the application. In one embodiment, at least one TPM is dedicated to authenticating one or more hosted applications.

Security ITE 100 may provide Multiple Level Security (MLS) for the various security services and hosted applications, where the levels of security to be provided may be determined as part of the authentication process. The security ITE 100 may include MLS at its operating system level, so that security levels may be selected for different applications executing on virtual machines (VMs) that are instantiated by the ITE 100. In one embodiment, the security ITE 100 may provide different security levels based on categorical distinctions. For example, security ITE 100 may include a plurality of VMs that are operated at different security levels, grouped into categories such as "helper" VMs and "guest" VMs. Of course, other categories and any number of categories are possible. The helper VMs may perform various functions in authenticating and providing security services (e.g., a key store, cryptography, data protection, secure communications, etc.) to clients, such as the applications 116, 126 discussed above. The guest VMs may be used for running hosted applications 168. Helper VMs (and the corresponding applications) may categorically be granted a higher security level than guest VMs, as the helper VMs may require a greater level of trust to effectively perform the various security operations for the security ITE 100. On the other hand, guest VMs may be given a relatively lower security level, as guest VMs may run applications that originate from computing systems having differing levels of trust. Additionally, because the applications on guest VMs may not be necessary (or even related) to providing security functionality, these applications may be given a relatively lower priority in the operation of the security ITE 100.

The helper VMs may include Registration Authority (RA) and Certificate Authority (CA) applications for providing certificates to support application registration and secure communications for the security ITE 100. Client applications such as applications 116, 126 provide criteria that are validated by the RA. Validation may be performed automatically or manually, and may include a lookup of the criteria in a registry, which may include a unique identifier assigned to the application. Once the application has been validated, the CA may issue the certificate for the application, enabling operation on (and communications with) the security ITE 100.

Other hardware on secure computing device 160 includes cryptographic engine 240. Cryptographic engine 240 may include an application-specific integrated circuit providing hardware-based algorithms in order to protect the encryption algorithms and to provide improved encryption performance. Cryptographic engine 240 may support any number of symmetrical and asymmetrical encryption algorithms and protocols, such as Data Encryption Algorithm (DEA), Triple DEA, Message Authentication Code (MAC), Hash-based MAC (HMAC), Advanced Encryption Standard (AES), Secure Hash Algorithm (SHA), RSA, Elliptic Curve Digital Signature Algorithm (ECDSA), Elliptic Curve Diffie-Hellman (ECDH), and Montgomery reduction, among others. Cryptographic engine 240 may also include a true random number generator, as well as a prime number key generator.

In order to ensure the integrity of the hardware components and data located within protection envelope 102, the security ITE 100 may be configured to detect tampering to prevent unauthorized access, such as physical tampering with physical enclosure 210. Upon determining that a tampering event has occurred, the security ITE 100 may be configured to erase data contained within the protection envelope 102 to prevent unauthorized access.

To detect tampering, secure computing device 160 may include a security manager 172 included in the physical enclosure 210 and coupled to one or more sensors 250. The security manager 172 may be implemented in hardware; though depicted as an entity separate from memory 164, alternate embodiments may provide security manager 172 implemented as software stored in memory 164 and executed using secure computing device 160. As shown, sensors 250 may include one or more voltage sensor(s) 252, temperature sensor(s) 254, and resistance sensor(s) 256; however, the sensor types need not be limited to those described here. Any number of different suitable sensors or calculations may be used by security manager 172 to determine the presence or absence of a tampering event.

To provide the ability to authenticate applications that interact with the security ITE 100, the security manager 172 may include a key store containing one or more keys 175. Each key 175 may be generated after registering a corresponding application with the security ITE 100, and the keys 175 may then be used to provide subsequent authentication of the registered applications. The keys 175 may be stored in hardware and created using a local master key, so that disabling the local master key will disable each of the keys 175.

As described above, the security ITE 100 (acting through security manager 172) may prevent unauthorized access to data within protection envelope 102 by erasing some or all of the data in response to detecting a tampering event. For example, security manager 172 may erase all of the data stored by the secure computing device 160 (e.g., including the entire memory 164). In other embodiments, the security manager 172 may selectively erase sensitive data; for example, the local master key may be erased (thereby disabling keys 175 and in turn, their corresponding applications), as well as portions of memory related to FPGAs 220 (e.g., corresponding to security functions or applications executing on the FPGAs).

Figure 2B:
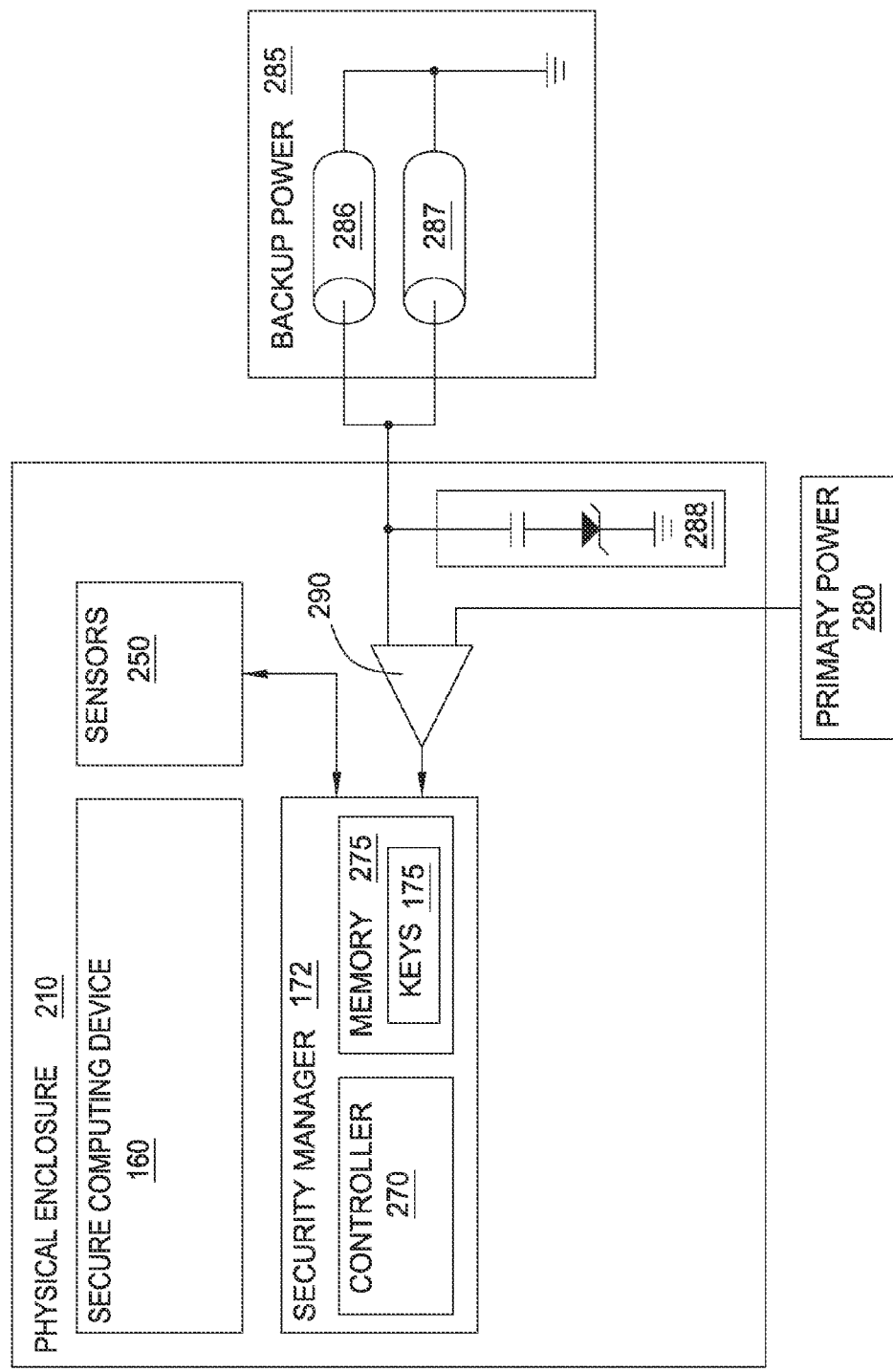
FIG. 2B illustrates a block diagram of tampering logic included in a security ITE, according to one embodiment.

FIG. 2B illustrates a block diagram of tampering logic included in a security ITE, according to one embodiment. Physical enclosure 210, secure computing device 160, sensors 250, and security manager 172 may be configured to operate in the same manner as described above with respect to FIG. 2A.

As shown, security manager 172 is depicted as a separate entity from secure computing device 160, but in alternate embodiments may be included as a part of secure computing device 160. Security manager 172 may include a separate controller 270 and memory 275; for example, memory 275 may be a non-volatile memory for storing keys 175, a local master key, and one or more measurements or values related to sensors 250.

As a loss of power to the security ITE 100 could indicate physical tampering with the physical enclosure 210, security manager 172 may include additional logic related to the power supplied to the security ITE 100. In the event of a power loss to the security ITE 100, the security manager 172 may be configured to erase data contained within the protection envelope 102 in a manner similar to that described above with respect to FIG. 2A. Of course, the security ITE 100 may be configured to distinguish between a loss of power due to tampering and a loss of power due to other causes (such as an ordinary power outage due to weather or other conditions). By distinguishing between types of power loss, the security ITE 100 may prevent unnecessarily deleting protected data. The security manager may monitor a primary power source 280, as well as one or more backup power sources 285. Primary power source 280 may include any suitable source of electrical power for the hardware components of the security ITE 100, for example, standard grid power coupled to the security ITE 100 through an AC adapter. Backup power source 285 may include one or more energy sources or storage devices, such as batteries 286 and 287.

The security manager 172 may be configured to monitor absolute measurements of one or more power sources, or relative measurements between sources, in order to distinguish a tampering-related power loss or to otherwise assess the operational status of the power sources. In one embodiment, security manager 172 may monitor the voltage level provided to the security ITE 100 (e.g., a common DC voltage provided to components such as $V_{CC}$ or $V_{DD}$). Of course, any other measure of the output from the primary power source may be suitable (e.g., a standard grid voltage, or current or power measurements). To compare primary and backup power sources, additional logic may be provided to the security manager 172, such as a comparator 290 configured to compare the voltage levels of the primary power source 280 and the backup power source 285 and provide a difference value to the security manager 172. Conditioning elements 288 may also be included to condition or stabilize the voltage level provided to the comparator 290 by the backup power source 285. The output of comparator 290 may further provide an indication to security manager 172 whether batteries 286 and 287 need to be charged.

Upon determining a failure of the primary and backup power sources to provide a suitable power signal to continue powering the security ITE 100 the security manager 172 may be configured to erase data contained within the protection envelope 102 to prevent unauthorized access. While such a simultaneous failure of the power sources might occur due to a total failure of the sources to power the security ITE 100 (e.g., the sources were entirely disconnected from the security ITE 100), it may also occur in response to performance decrease below a predefined threshold (e.g., an output voltage from each of the power sources falls outside of a prescribed range for operating the security ITE 100).

Figure 3B:
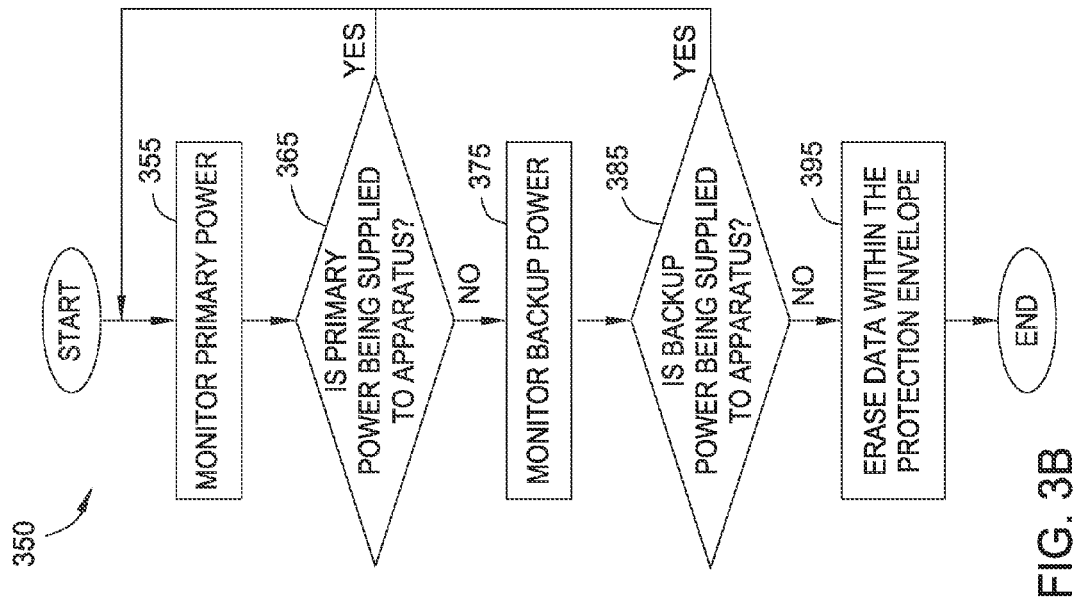
FIGS. 3A and 3B illustrate methods for protecting data contained within the protection envelope, according to one or more embodiments.
Figure 3A:
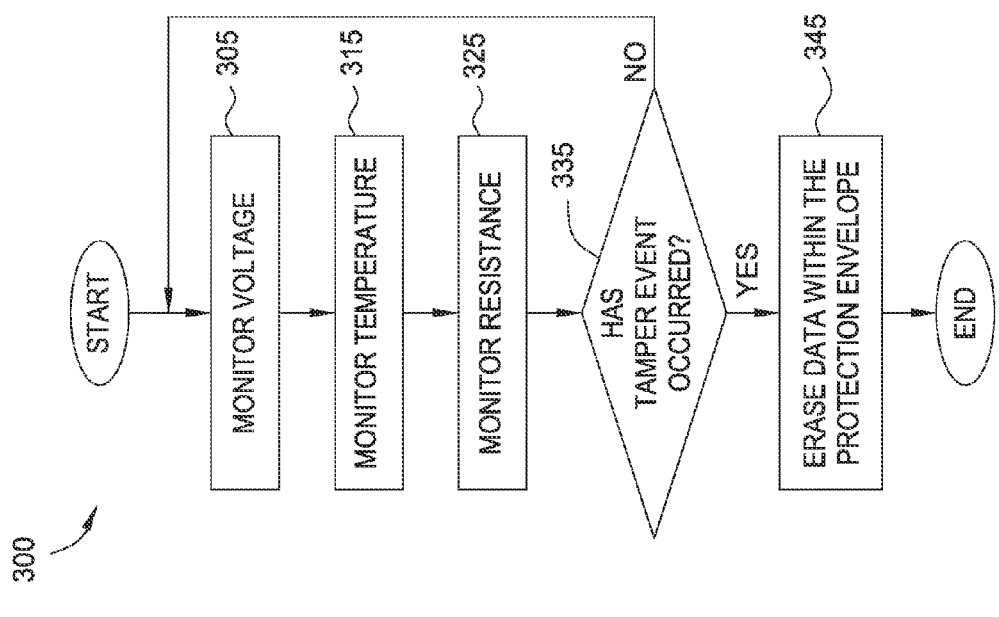

FIG. 3A illustrates a method for protecting data contained within the protection envelope, according to one embodiment. For example, method 300 may be used by a security manager 172 configured to detect tampering events and prevent unauthorized access to data within the protection envelope 102, such as is discussed above with respect to FIG. 2B. Method 300 begins at block 305, at which the security manager monitors a voltage measurement at one or more points within the physical enclosure, such as power supply pin(s) of CPU 162. Security manager 172 may be coupled to one or more sensors 250 (for example, a voltage sensor 252) providing measurements to the security manager 172, which may process the measurement values to determine whether a tampering event has occurred, or may store the values for later comparison.

At block 315, the security manager monitors a temperature measurement. A significant deviation from a normal operating temperature may indicate an abnormal condition within the physical enclosure 210, whether caused by a malfunction of the heat dissipation system or heat-generating components, or by a tampering event (e.g., the heat transfer characteristics between the interior of physical enclosure 210 and the surrounding environment have changed due to a physical penetration of the physical enclosure). The temperature measurement may be taken at one or more points within the physical enclosure, such as measuring the temperature at one or more components of the security ITE 100 (e.g., at the CPU 162 and heat sink 120) and/or at other points.

At block 325, the security manager monitors a resistance measurement. A change in the resistance measurement might indicate an abnormal condition within the physical enclosure 210, such as a failure of a hardware component, or a short circuit, or a change in the configuration of the hardware components within the physical enclosure 210. For example, a change in a resistance measurement on the PCB 130 could indicate that one or more components have been removed from the PCB, or that unauthorized devices (e.g., conductive leads or different components) have been coupled to the PCB or components. And similar to the temperature measurement described above, the resistance measurement may be taken at one or more points within the physical enclosure (e.g., at particular components, or perhaps measuring resistance of conductive traces interconnecting components on the PCB 130).

The tampering logic itself may include one or more predefined threshold values that correspond to each of the different measurements, such that when a measurement value exceeds (or, in the case of a minimum threshold, decreases to less than) a corresponding threshold value, the tampering logic indicates to the security manager 172 that a tampering event has occurred. The measurements taken at blocks 305, 315, and 325 may be stored by the security manager 172 to provide a reference with which to compare future measurements. Further, statistical analysis (for example, mean or standard deviation) may also be performed on stored measurements to provide the range or threshold values against which future measurement values are compared.

Of course, monitoring need not be limited to the voltage, temperature, and resistance measurements described above; any number of different suitable sensor measurements or calculations may be used by security manager 172 to indicate the presence or absence of a tampering event. For instance, additional measurements may be provided to security manager 172 to ensure the integrity of the fencing structure described above with respect to FIG. 1B. Further, any of the monitoring functions, such as those described in blocks 305, 315, and 325, may be performed in any order, or may be performed simultaneously. The selected monitoring functions and their ordering may be specified by the tampering logic of the security manager 172.

At block 335, the security manager 172 determines whether a tampering event has occurred. Although shown as a single discrete step following blocks 305, 315, and 325, this determination may be made at any time relative to the various measurements, for example, once following each of blocks 305, 315, or 325, or responsive to any measurement exceeding (or decreasing to less than) a threshold. If security manager 172 determines that a tampering event has not occurred, the method resumes monitoring the various measurements, returning to block 305.

However, if the security manager determines that a tampering event has occurred, the method proceeds to block 345, where the security manager erases data contained within the protection envelope. As discussed above, the data to be erased may include all of the data within the secure computing device 160 (e.g., including the entire memory 164) or merely certain sensitive data; for example, the local master key may be erased (thereby disabling use of keys 175) as well as portions of memory related to FPGAs 220 (e.g., corresponding to security functions or applications executing on the FPGAs).

FIG. 3B illustrates a method for protecting data contained within the protection envelope, according to one embodiment. Method 350 may also be used by a security manager 172 in addition to, or as an alternative to, method 300 to indicate the presence or absence of a tampering event. For example, security manager 172 may perform method 300 and method 350 substantially simultaneously.

Method 350 begins at block 355, at which the security manager monitors the primary power source for the security ITE 100. The primary power source, which may be the primary power source 280 described above, may include any suitable source of electrical power for the hardware components of the security ITE 100, for example, standard grid power coupled to the security ITE 100 through an AC adapter. In one embodiment, the security manager monitors the voltage level provided to the security ITE (e.g., a common DC voltage provided to components such as $V_{CC}$ or $V_{DD}$). Of course, any other measure of the output from the primary power source may be suitable (e.g., standard grid voltage, or current or power measurements).

At block 365, the security manager determines whether primary power is being supplied to the security ITE. In some embodiments, the security manager indicates inadequate primary power only upon determining that a complete loss of power from the primary power source has occurred. In alternate embodiments, the security manager includes a predefined threshold which the voltage level (or other selected measurement) of the primary power source should ordinarily exceed, or may include a range within which the measurement should remain. If primary power is being supplied to the security ITE, the method may loop back to block 355 and continue monitoring the primary power source. However, if the security manager determines that (adequate) primary power is not being supplied, the method may proceed to block 375.

At block 375, the security manager monitors the backup power source for the security ITE 100. The backup power source may be the backup power source 285 described above, and may include one or more batteries 286 and 287. Security manager 172 may generally monitor the backup power source using the same or similar techniques as those used to monitor the primary power source at block 355.

At block 385, the security manager determines whether backup power is being supplied to the security ITE. In some embodiments, the security manager may indicate inadequate backup power when it determines that a complete loss of power from the backup power source has occurred, for example, a physical disconnection of the backup power source from the security ITE 100. In alternate embodiments, the security manager may determine that the backup power is inadequate when a measurement of the backup power falls below a predefined threshold that the voltage level (or other selected measurement) source should ordinarily exceed, or falls outside a range within which the measurement should remain. For example, settings in the security manager may specify that an output voltage provided by the backup power source should be in the range of 3.0 to 5.0 volts; if the output voltage falls outside this range (e.g., 2.4 volts or 5.5 volts), the security manager indicates that the backup power signal is inadequate.

If backup power is being adequately supplied to the security ITE 100, the method may loop back to block 355 and continue monitoring the primary power source. Alternately, the method may loop back to block 375 and continue monitoring the backup power source. However, if the security manager determines that the backup power is not being adequately supplied, the method may proceed to block 395, where the security manager erases data contained within the protection envelope. As discussed above, the data to be erased may include all of the data within the secure computing device 160 (e.g., including the entire memory 164) or merely certain sensitive data; for example, the local master key and portions of memory related to FPGAs 220 may be erased.

Of course, monitoring the primary and backup power sources may occur simultaneously or in any order, or monitoring may be triggered (i.e., the backup power is only monitored in response to determining a failure of the primary power, or vice versa). For example, both primary and backup sources may be monitored simultaneously using the additional logic described above with respect to FIG. 2B (i.e., where values from each power source are input to a comparator and the difference signal provided to the security manager).

Figure 4:
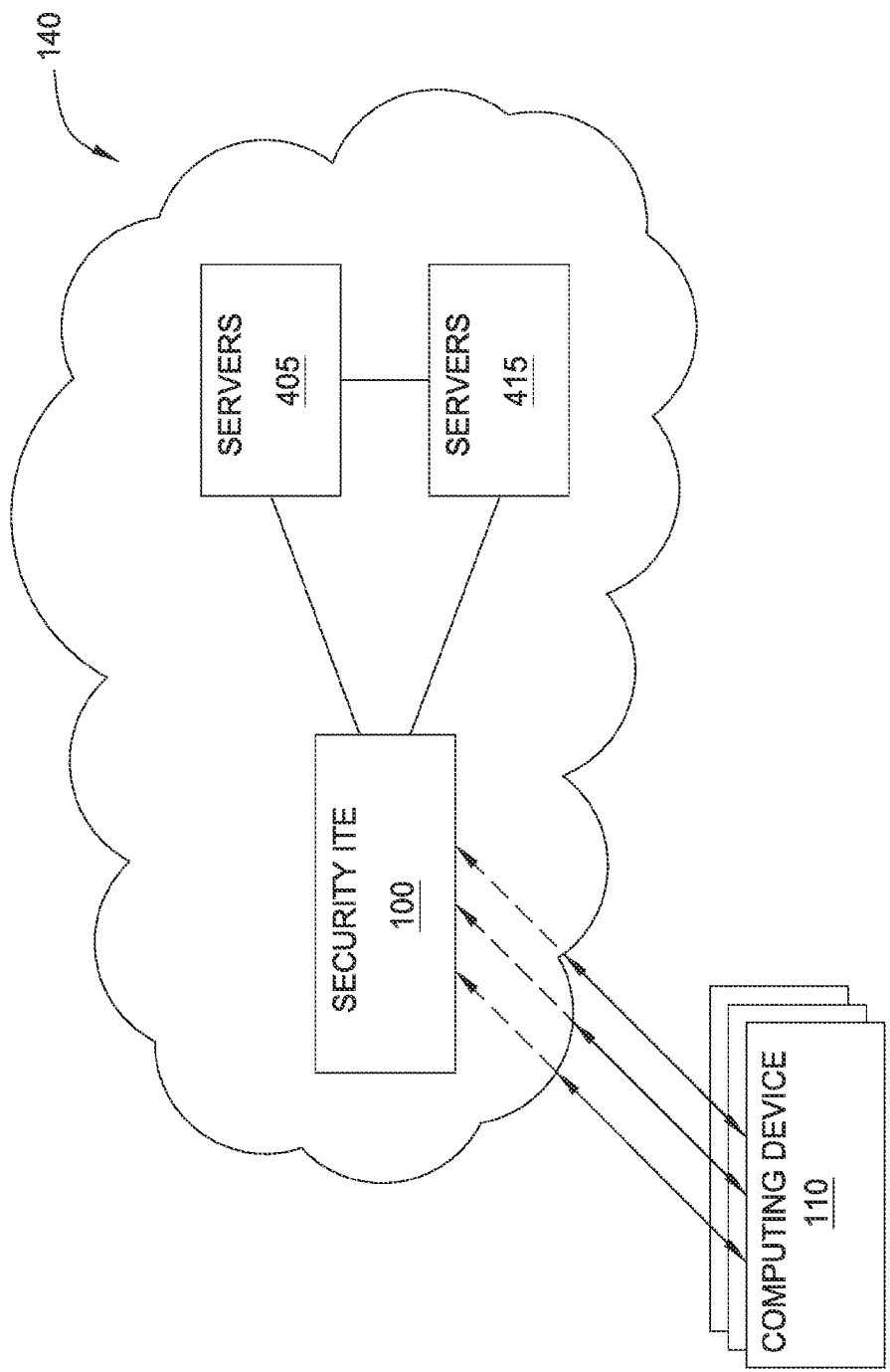
FIG. 4 illustrates a networked security ITE, according to one embodiment.

FIG. 4 illustrates a networked security ITE, according to one embodiment. As described above, security ITE 100 may be configured to provide security services to one or more networked computing devices, such as computing devices 110. The network arrangement may be in any feasible networking configuration; for example, the computing devices 110 may each be communicatively coupled to the security ITE through a LAN or WAN, and the network arrangement may further include one or more networked servers 405, 415. The network arrangement may also be deployed as part of a cloud computing environment.

Applications handling sensitive data may need to protect the data when transmitted between networked devices, whether the requirement originates from law, regulation, or agreement, or perhaps merely as a matter of prudence. For example, applications in the healthcare field must comply with provisions of the Health Insurance Portability and Accountability Act (HIPAA), which requires certain safeguards to prevent unauthorized access and modification to protected health information being transmitted electronically.

As functionally similar applications related to a particular field will presumably be subject to the same rules and regulations, the programmers of the various applications may generally be required to implement security measures in relative isolation from other programmers' efforts. Because these security measures are ordinarily developed or implemented independently, the programmers may be hindered from developing and using a collective set of best practices for the industry. Further, programmers in their individual efforts to implement suitable security measures may inadvertently introduce vulnerabilities into the applications, which could ultimately jeopardize the security of the data.

The security ITE may be configured to provide security services to requesting applications. In this way, the security ITE may provide modular, tailored security services to meet the requirements for a variety of different applications. The requirements for various applications may based on information about the application, such as the services required by the application, as well as preferences specified for the application.

During operation, the security ITE may ordinarily select and provide security services that meet minimum application requirements, or that may also meet the determined best practices for the particular industry, in accordance with stored application profiles. However, in some cases, a current configuration of the security ITE may be unable to meet minimum application requirements. Upon receiving a request for security services from a particular application, policy decision and policy enforcement modules (which may be applications run on helper VMs of the security ITE) may determine that the security ITE cannot meet the particular application's requirements, and may determine how to appropriately address the pending request. In one example, the policy enforcement module could outright deny the application's request for security services from the security ITE. Another example includes the security ITE instantiating a new helper VM (with corresponding security application(s)) that can meet the requesting application's requirements. In another example, where multiple security ITEs are networked, the security ITE receiving the request but unable to fulfill may query the other networked security ITEs to determine if any have the capability (configuration and availability) to perform the requested security services. The security ITE receiving the request could then offload the request to the capable security ITE for fulfillment. In yet another example, the security ITE receiving the request may cease execution of select operations, or may offload those operations to other networked security ITEs, in order to be capable of fulfilling the security services for the requesting application.

Figure 5A:
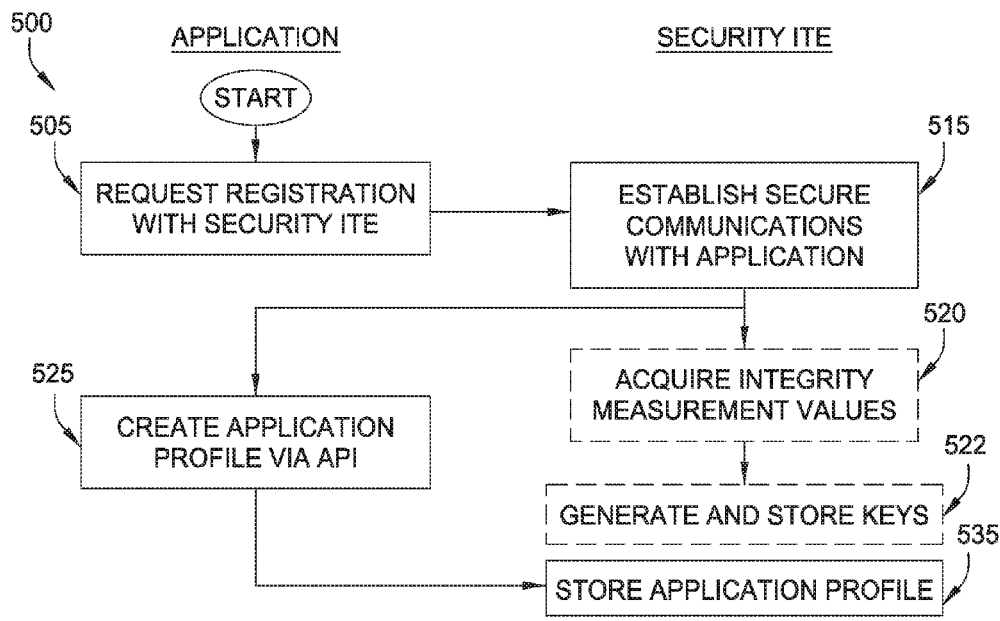
FIG. 5A illustrates a method for registering an application with a security ITE, according to one embodiment.

FIG. 5A illustrates a method for registering an application with a security ITE, according to one embodiment. The registration process will generally precede the security ITE providing security services to a requesting application. The application may be executing on the security ITE itself (i.e., as a virtual machine), or may be an application executing on a networked computing device such as computing device 110.

Method 500 begins at block 505, where the application requests registration with the security ITE. At block 515, the security ITE establishes secure communications with the requesting application (and the corresponding computing device); the security ITE may use known authentication techniques, such as IPSec. As a result of the authentication, the security ITE may issue a Transport Layer Security (TLS) certificate for the application. Following block 515, the method may proceed along multiple paths as certain events may occur substantially in parallel (not necessarily simultaneously) with the security ITE and with the application.

At block 520, the security ITE may acquire integrity measurement values for the application to be used for subsequent authentications of the application; the integrity measurement values may be acquired, for example, using a TPM included in the security ITE. At block 522, the security ITE may then use the TLS certificate and acquired integrity measurement values to generate and store an authentication key for the application.

Following issuance of the TLS certificate for the application (i.e., after establishing secure communication between the application and the security ITE), at block 525 the application may create an application profile that will be stored with the security ITE at block 535. As described above, an application profile may be created specific to each application registered with the security ITE. Application profiles may be created using an application programming interface (API) and may specify the security functions to be performed by the security ITE for the application. The profiles may have multiple fields for including additional information about the application, such as a unique name and identifier for the application, an industry type for the application (such as healthcare or finance), an estimated data quota, and any performance requirements. Application profiles may also include one or more fields where a user may specify preferences for the security services to be provided, such as whether to perform data splitting and which algorithm to use, which cryptographic algorithm to use and a required key length. The application profiles may further provide a default setting for one or more of the preferences, in which the security ITE may apply best practices. In another embodiment, the security ITE may apply best practices for the security services based on the specified industry type. For example, security ITE may apply security settings to meet at least regulated minimum security requirements for the industry; security ITE may apply more stringent settings based on its determined best practices. Method 500 ends after the application profile is stored with security ITE at block 535.

Figure 5B:
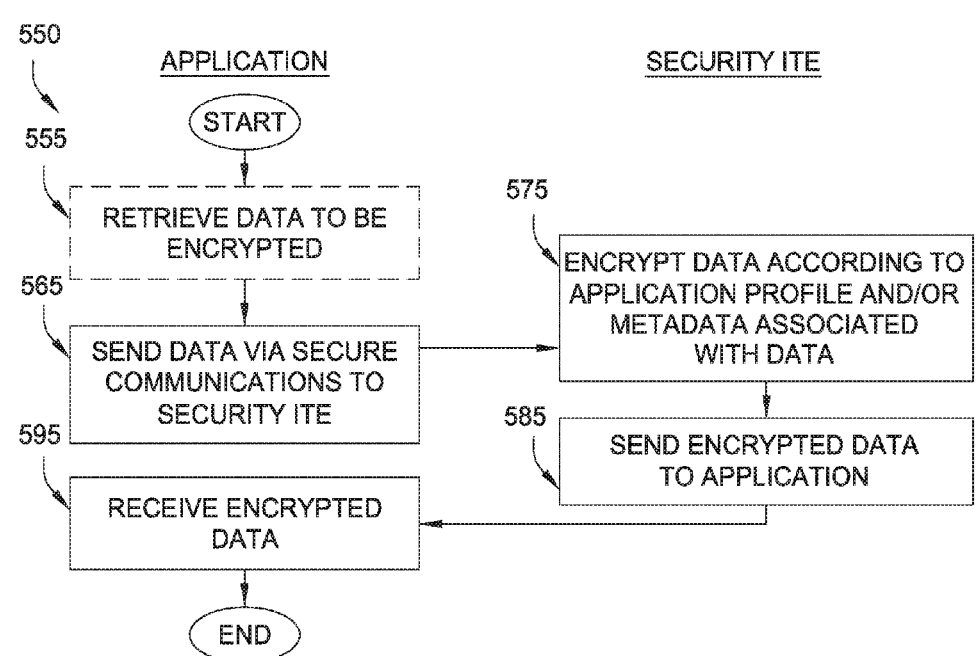
FIG. 5B illustrates a method for obtaining security services using an application registered with a security ITE, according to one embodiment.

FIG. 5B illustrates a method for obtaining security services using an application registered with a security ITE, according to one embodiment. Method 550 may occur subsequent to registering the application with the security ITE, for example, using method 500 described above. Method 550 begins at block 555, where an application may retrieve data to be encrypted. The data may be retrieved from local or networked storage or another computing device.

At block 565, the retrieved data is transmitted using the secure communications link from the application to the secure ITE. At block 575, the security ITE encrypts the data according to the application profile and/or metadata associated with the data. As described above, application profiles may specify the security functions to be performed by the security ITE for the application. The profiles may include additional information about the application, such as a unique name and identifier for the application, an industry type for the application (such as healthcare or finance), an estimated data quota, and any performance requirements. Application profiles may also include one or more preferences for the security services to be provided, such as whether to perform data splitting and which algorithm to use, which cryptographic algorithm to use and a required key length. The application profiles may further provide a default setting for one or more of the preferences, in which the security ITE may apply best practices. In another embodiment, the security ITE may apply best practices for the security services based on the specified industry type. For example, security ITE may apply security settings to meet at least regulated minimum security requirements for the industry; security ITE may apply more stringent settings based on its determined best practices.

The data itself may include additional information (metadata) indicating the type of data, such as particular types of medical records or financial information; the security ITE may use the metadata in combination with information and preferences in the application profile to determine how to process the data.

After the security ITE completes its processing of the data, at block 585 the security ITE transmits the processed data back to the application; although the processed data may be encrypted to meet specified security requirements such that secure communications is no longer necessary, the security ITE may still use the already established secure communications link to transmit the encrypted data to the application. Alternatively, the application profile or the metadata may have indicated that the security ITE should transmit the processed data directly to a target location (which would reduce network traffic). The method ends after block 595, when the application receives the processed data.

As an example using method 550, a healthcare provider wishes to transmit unencrypted information to update a patient's electronic medical record, which is stored remotely at a medical repository and accessible through a network (e.g., the internet). Using an application executing on a terminal or other networked computing device at the healthcare facility (or alternatively, operating on the security ITE), the provider may indicate what information will be transmitted to the medical record. Assuming there is protected medical information included in the information to be transmitted, relevant laws and regulations enumerate minimum security requirements that must be met to transmit the information. Further assuming the application has already registered with a security ITE (which may be local or remote) and has a suitable secure communications link available, the application may send the unencrypted information using the secure communications link to the security ITE to be encrypted for subsequent transmission to the medical repository. This way, the application need not be responsible for performing the encryption or updating the encryption functions to meet new standards or protocols.

Upon receiving the data, the security ITE uses information in the application profile (i.e., that application data requires protection according to requirements of the healthcare field, and optionally security preferences), and perhaps metadata specified by the information itself (indicating the type of medical information) to determine how to encrypt the information. After performing the encryption, security ITE transmits the encrypted data back to the application. The application may then transmit the encrypted data to the medical repository using an available communication link, whether or not the link is secure. Alternatively, the application may specify a destination for the encrypted data, so that upon completing the security functions, security ITE 100 may transmit the encrypted data directly to the repository, instead of transmitting through the application to the repository.

Figure 6A:
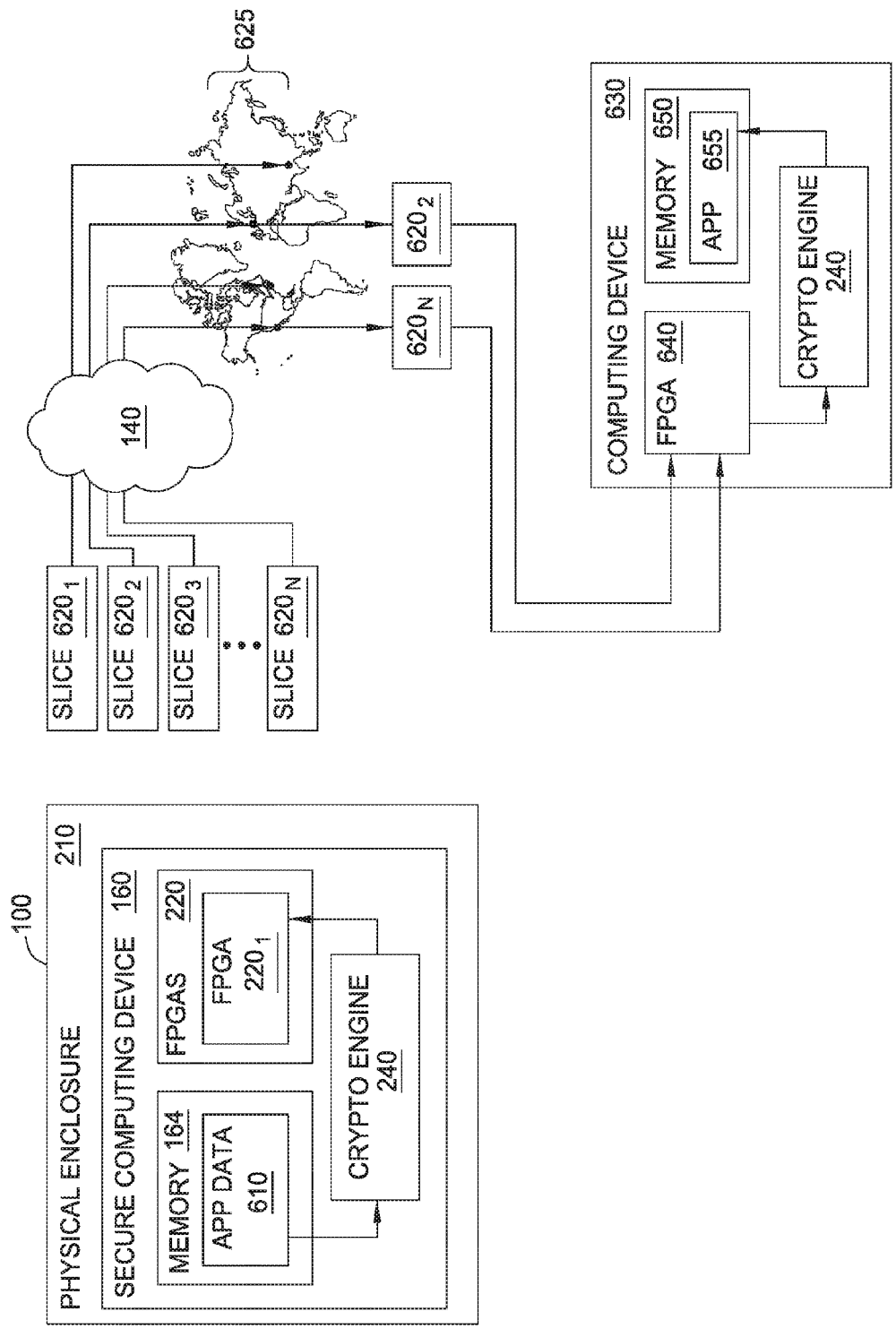
FIGS. 6A and 6B illustrate secure transmission of data over a network using an information dispersal algorithm, according to one embodiment.

FIG. 6A illustrates secure transmission of data over a network using an information dispersal algorithm, according to one embodiment. As shown, security ITE 100 includes a secure computing device 160 having memory 164, FPGAs 220, and cryptographic engine 240. Though not depicted here for the sake of clarity, security ITE 100 may include other components, such as any of those described above with respect to FIGS. 2A and 2B. In this example, the application seeking to transmit encrypted information over the network is executing on the secure computing device 160 itself. During execution of the application, the application data 610 that is to be encrypted is retrieved from memory 164 and processed through cryptographic engine 240. The secure computing device 160 may select the algorithm for the cryptographic engine 240 based on the application profile, as well as any metadata about the data to be encrypted (e.g., tags indicating the type of data). The application profile may specify in its security settings that the data should be dispersed (a process which will be described more fully below); certain algorithms supporting homomorphic encryption (or any other types of encryption allowing division and subsequent reconstruction of encrypted data) may be used in this case. Optionally, the output from cryptographic engine 240 may be saved back into memory 164 prior to further processing or transmission. At this point, the entire mass of encrypted data could be directly transmitted to one or more nodes on the network, such as to computing device 630.

For enhanced security and availability of the encrypted application data (whether the data is being actively transferred or will be at rest), the data may be dispersed across several locations using an information dispersal algorithm (IDA). The IDA may be applied to data (whether encrypted or unencrypted) prior to its transmission from the secure ITE 100, for example, using an FPGA $220_1$. First, the data is distributed into multiple slices $620_1$-$620_N$, each of which may contain a differing amount of data; in any case, the slices will be smaller than the entire amount of data to be transmitted. Individually, the slices may contain too little information to be useful (i.e., an individual slice cannot reproduce the entire amount); however, the IDA may be configured so that a predefined number of slices (or a predefined percentage) can be used to reconstruct the entire amount of data (e.g., M of N slices). In this case, the IDA selects a distribution (and redundancy) of data among the slices such that any set of M slices taken from the N slices created will be able to reproduce the entire amount of data. The slices $620_1$-$620_N$ may be distributed across network 140 to a plurality of geographically dispersed nodes 625, each of which may store the respective slice(s), and which may be accessed during the process of reconstructing the data. In this example, two slices are the minimum needed to reproduce the original data; however, other embodiments may select any other number of slices to be the minimum number, consistent with security requirements and preferences and any limitations of the IDA.

In response to a request for the original data by an application 655 executing on computing device 630, at least a minimum number of slices (in this example, two slices $620_N$ and $620_2$) may be retrieved by computing device 630. Computing device 630 may process the received slices through an FPGA 640, the output of which will be the entire reconstructed amount of data. In turn, the reconstructed data may be decrypted using a cryptographic engine 240 before the original data is returned to the requesting application 655. Though computing device 630 is shown as structurally similar to the secure computing device 160, computing device 630 may have alternate configurations capable of performing the disclosed functions. For example, the logic required for processing the slices to reconstruct the data, and/or for decrypting the reconstructed data, may alternately be implemented in different hardware components or in software or firmware in the computing device 630.

Figure 6B:
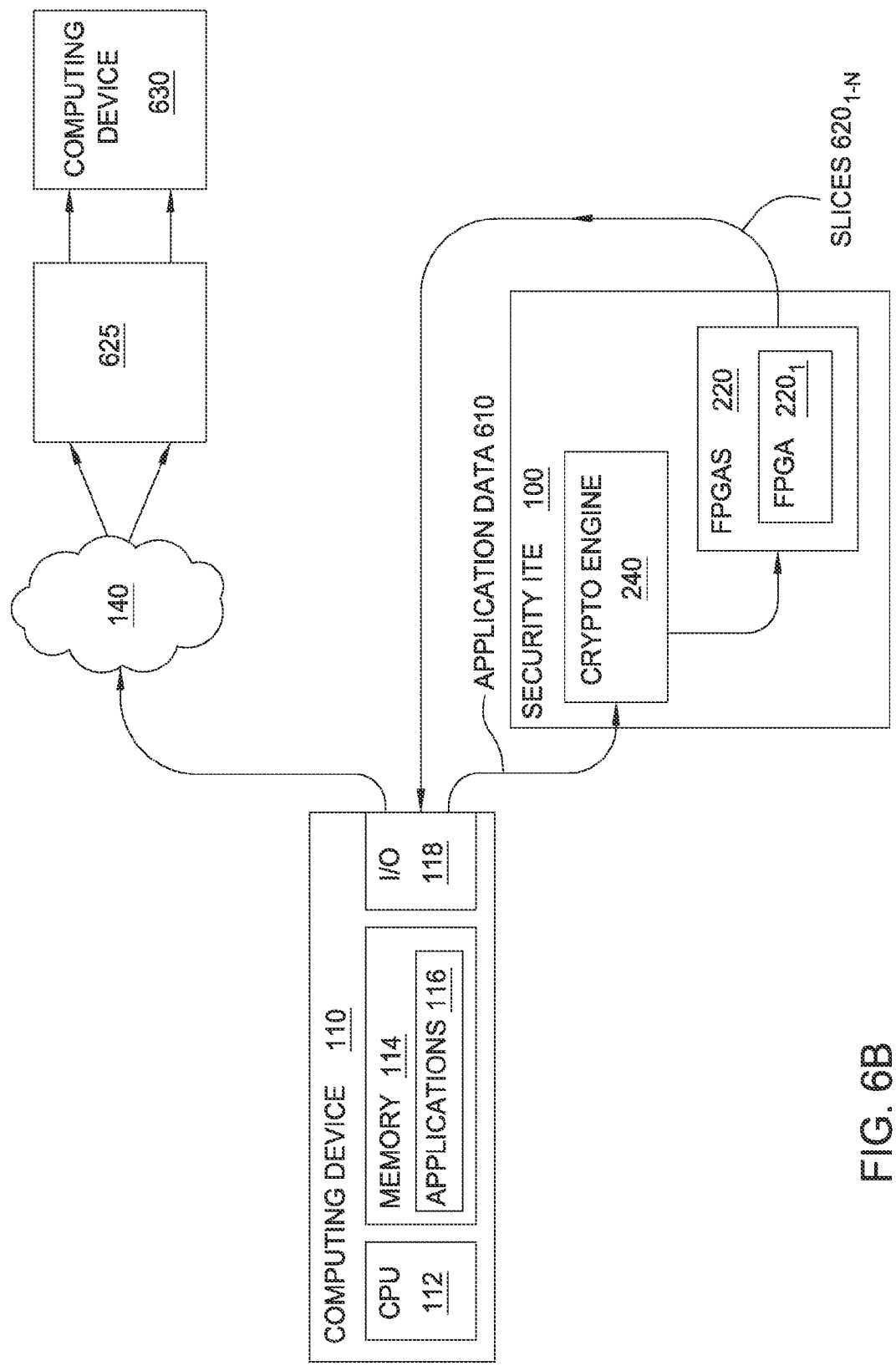

Next, FIG. 6B illustrates secure transmission of data over a network using an information dispersal algorithm, according to one embodiment. In this example, the application seeking to transmit encrypted information over the network is executing on a separate computing device 110 that is networked to the security ITE 100. The application may have already registered with the security ITE 100 using a process such as method 500, thus establishing a secure communications link between the two. Using the secure link between input/output (I/O) 118 and the security ITE 100, application 116 may transmit unencrypted application data 610 to the security ITE to be encrypted. The operation of the cryptographic engine 240 and FPGA 220 on the transmitted data may generally be the same as described above with respect to FIG. 6A. The output from security ITE 100, which is returned to the application 116 through the secure link, may be the entire mass of encrypted data, or may be multiple slices 620$_{1-N}$ of encrypted data. As in FIG. 6A, the slices may be distributed across network 140 to a plurality of geographically dispersed nodes 625, and a number of slices may ultimately be received at a computing device 630, which may then reconstruct the data.

Figure 7:
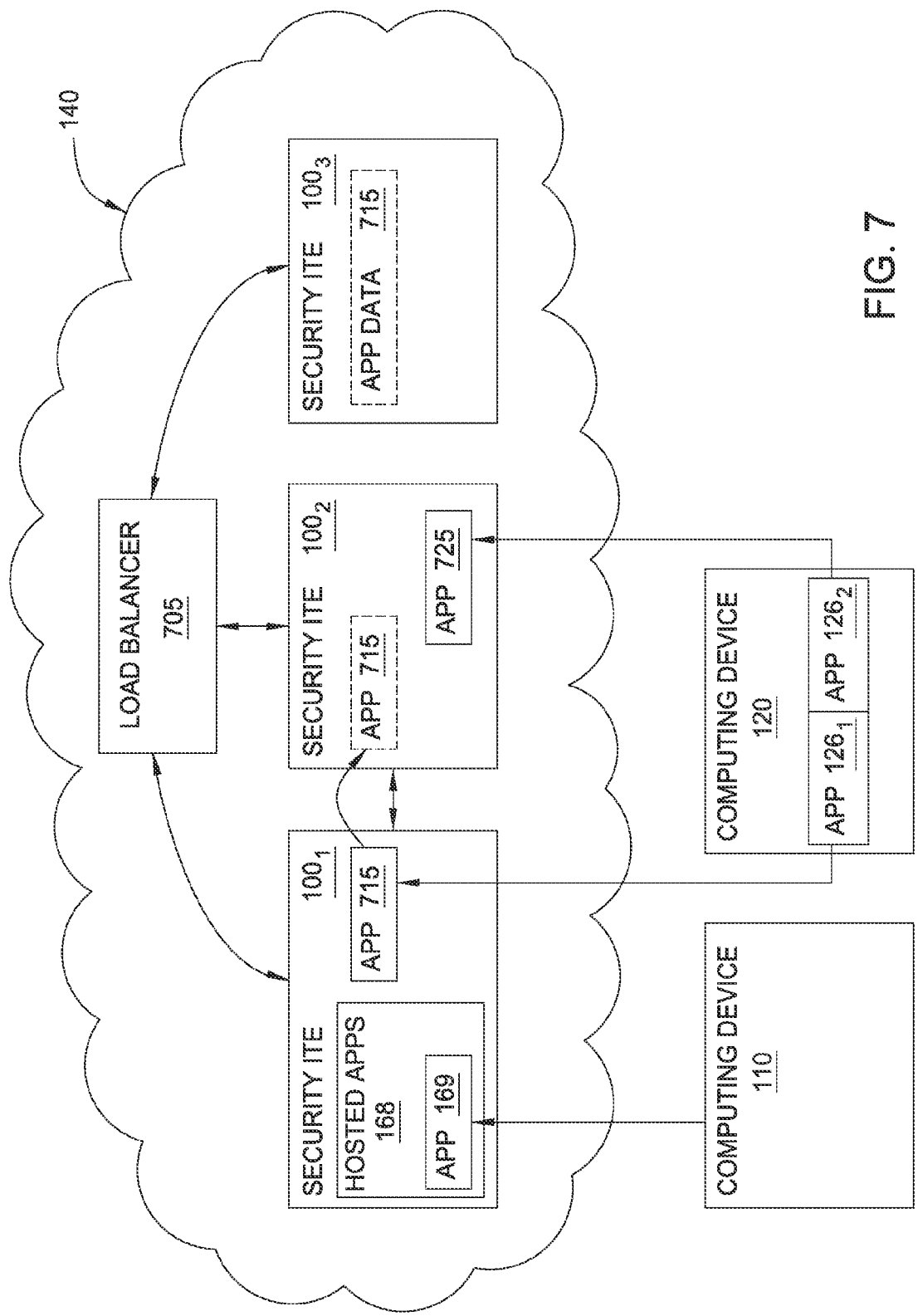
FIG. 7 illustrates multiple security ITEs deployed in a networked environment, according to one embodiment.

FIG. 7 illustrates multiple security ITEs deployed in a networked environment, according to one embodiment. Shown are three security ITEs 100$_1$-100$_3$ within network 140; of course, any preferred number of security ITEs could be included in the networked environment. Within network 140, the security ITEs may be configured to collectively provide a pool of security services to one or more devices coupled to the network, for example, as part of a cloud computing environment.

As shown, computing device 110 is hosting an application 169 on security ITE 100$_1$, and applications 126$_1$ and 126$_2$ are executing on computing device 120. In this example, applications 126$_1$ and 126$_2$ may have respectively registered with security ITE 100$_1$ and 100$_2$, so that application profiles were established on the security ITE corresponding to each application. Because each application has established a secure communications link to its respective security ITE, the unencrypted data may be sent from the application without potentially violating security requirements for data transmission. The data sent from application 126$_1$ to be encrypted and/or transmitted is application data 715 (which as shown is initially residing on security ITE 100$_1$), and the data sent from application 126$_2$ to be encrypted and/or transmitted is application data 725 (residing on security ITE 100$_2$).

The networked security ITEs 100 may monitor individual and/or collective computational performance while operating applications and may be capable of reconfiguring tasks or jobs to meet minimum computational requirements. For instance, applications may specify in their application profile that in-line (i.e., real-time) encryption should be performed on time-sensitive data sent to security ITE 100. To continue the earlier example, assume that hosted application 169 has increased computational demands (i.e., more processing cycles and/or more memory is required to continue execution of the application), such that the task or job (i.e., the encryption functions) requested by application 126$_1$ for application data 715 may be performed at an unacceptably slow rate (e.g., the rate falls below the "in-line" threshold, which value may be calculated by the security ITE 100$_1$ or specified by the application profile stored on security ITE 100$_1$). Upon determining that the rate will not meet the requirements, security ITE 100$_1$ may seek to transfer the task to another security ITE capable of handling the task's computational demands. The security ITE 100$_1$ may determine whether another security ITE is capable of the computational demands. For example, security ITE 100$_1$ may query one or more other security ITEs, such as security ITE 100$_2$, using information about the task (e.g., size and type of data, any requirements specified by the application profile, etc.). If the security ITE 100$_2$ is capable of handling the task, security ITE 100$_1$ may begin the transfer of the task by transferring the application profile to security ITE 100$_2$, as well as updating any keys and certificates (if necessary) to allow secure communications between the security ITE 100$_2$ and application 126$_1$ on computing device 120. To facilitate this transfer, secure communications may also need to be established between each of the security ITEs, as the transferred data may leave the protection envelope of one security ITE en route to the protection envelope of another security ITE.

Alternatively, a load balancer 705 may be coupled to multiple security ITEs, and using its internal logic may selectively distribute tasks to adjust the computational workload across the security ITEs. For example, load balancer 705 may determine that security ITE 100$_1$ has a relatively large computational workload assigned (i.e., hosted application 169 and the task associated with application 126$_1$ and application data 715) and may seek to shift the assignment of one or more tasks or applications to different security ITEs. The load balancer 705 may make its determination based on a predefined threshold, such as a threshold specified by security ITE 100$_1$ or by a stored application profile as described above; alternately, load balancer 705 may use any known load balancing techniques to distribute tasks or applications. In this example, load balancer 705 may determine that security ITE 100$_3$ has no workload currently assigned and may selectively distribute work accordingly, shifting the task associated with application 126$_1$ and application data 715 to security ITE 100$_3$.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
    registering a first application with a first security information technology element (ITE), the first security ITE comprising a secure computing device located within a protection envelope and configured to provide security services for one or more applications;
    creating an application profile corresponding to the registered application and specifying an industry type of the registered application, the industry type associated with one or more security requirements for the registered application;
    receiving, at the first security ITE and over a secure communications link, a request from the registered application specifying a first data item;
    determining, based on the industry type, one or more security operations to perform on the first data item, wherein the one or more security operations are adapted to satisfy the one or more security requirements for the registered application;
    performing the one or more security operations on the first data item in accordance with the application profile, thereby producing a modified first data item; and
    returning, over the secure communications link, the modified first data item to the registered application.

2. The method of claim 1, wherein the first security ITE is configured to erase data within the protection envelope upon detecting a tampering event.

3. The method of claim 2, wherein registering a first application comprises establishing the secure communications link between the first application and the security ITE.

4. The method of claim 3, wherein registering a first application further comprises generating a key for authenticating the first application, and wherein the data erased upon detecting a tampering event includes the key.

5. The method of claim 1, wherein the security services include one or more of encrypting data and data splitting.

6. The method of claim 1, wherein the application profile is configured to include one or more preferences for the security services.

7. The method of claim 1, wherein the industry type is one of healthcare and finance.

8. The method of claim 1, wherein determining the one or more security operations to perform on the first data item comprises:
    identifying one or more minimum security requirements having a predetermined association with the industry type; and
    determining whether to apply more stringent security requirements than the minimum security requirements, wherein the one or more security operations to perform on the first data item are selected from the one or more minimum security requirements and the more stringent security requirements.

9. The method of claim 8, wherein the more stringent security requirements are applied by default.

10. The method of claim 9, wherein the more stringent security requirements have a predetermined association with the industry type.

11. The method of claim 1, wherein the application profile further specifies at least a first performance requirement for the security services, the method further comprising:
    determining that performing the one or more security operations on the first data item using the first security ITE will not meet the first performance requirement; and
    transferring the application profile to a second security ITE to perform the one or more security operations on the first data item.

12. The method of claim 11, wherein the first performance requirement comprises a real-time encryption of data designated as time-sensitive by the registered application.

13. The method of claim 11, further comprising:
    establishing a second secure communications link between the registered application and the second security ITE.

14. The method of claim 13, further comprising:
    establishing a third secure communications link between the first security ITE and the second security ITE.

15. The method of claim 11, further comprising:
    selecting, using a load balancer, the second security ITE from a plurality of networked security ITEs that includes the first security ITE and the second security ITE.

16. The method of claim 11, further comprising:
    querying, using the first security ITE, the second security ITE to determine whether the second security ITE is capable of performing the one or more security operations to thereby meet the first performance requirement.

17. The method of claim 16, wherein querying the second security ITE comprises transmitting one or more of (a) a size of the first data item, (b) a type of the first data item, and (c) the first performance requirement.

18. The method of claim 1, wherein performing the one or more security operations on the first data item comprises encrypting the first data item according to a predefined cryptographic algorithm.

19. The method of claim 18, further comprising:
    selecting the predefined cryptographic algorithm based on one or more of (a) the application profile and (b) properties of the first data item.

20. The method of claim 19, wherein performing the one or more security operations on the first data item further comprises dispersing the data according to a predefined information dispersal algorithm (IDA).

* * * * *